United States Patent [19]

McKee et al.

[11] Patent Number: 4,694,042
[45] Date of Patent: Sep. 15, 1987

[54] ELASTOMERIC THERMOPLASTIC MOLDING MATERIALS AND THEIR PREPARATION

[75] Inventors: Graham E. McKee, Weinheim; Hilmar Ohlig, Kaiserslautern; Horst Reimann, Worms; Hans-Josef Sterzel, Dannstadt-Schauernheim, all of Fed. Rep. of Germany

[73] Assignee: BASF Aktiengesellschaft, Ludwigshafen, Fed. Rep. of Germany

[21] Appl. No.: 696,790

[22] Filed: Jan. 31, 1985

[30] Foreign Application Priority Data

Feb. 2, 1984 [DE] Fed. Rep. of Germany ....... 3403576

[51] Int. Cl.⁴ .................... C08L 75/00; C08L 77/00
[52] U.S. Cl. .................... 525/66; 525/164; 525/177; 525/183; 525/184
[58] Field of Search ........... 525/66, 183, 184, 177, 525/190, 164

[56] References Cited

U.S. PATENT DOCUMENTS

| | | | |
|---|---|---|---|
| 3,793,402 | 2/1974 | Owens | 525/87 |
| 4,141,863 | 2/1979 | Coran et al. | 260/3 |
| 4,173,556 | 11/1979 | Coran et al. | 260/30.8 R |
| 4,221,879 | 9/1980 | Humme et al. | 525/66 |
| 4,327,199 | 4/1982 | Coran et al. | 525/176 |
| 4,338,409 | 7/1982 | Grigo et al. | 525/66 |
| 4,474,927 | 10/1984 | Novak | 525/66 |
| 4,614,763 | 9/1986 | Trabert et al. | 525/66 |

OTHER PUBLICATIONS

Rubber World Blue Book, 1975 edition, pp. 452 and 453.

*Primary Examiner*—John C. Bleutge
*Assistant Examiner*—A. Carrillo
*Attorney, Agent, or Firm*—Keil & Weinhauf

[57] ABSTRACT

Elastomeric thermoplastic molding materials contain (A) from 5 to 50 parts by volume of a partially or completely crystalline thermoplastic polymer having a melting point of above 160° C., as a coherent phase, and (B) from 95 to 50 parts by volume of one or more crosslinked elastomeric polymers which are prepared by emulsion polymerization, are dispersed in the component A and have a glass transition temperature Tg of below $-10°$ C., the sum of A and B being 100 parts by volume, with the proviso that the mixture of A and B has a Vicat softening temperature, measured according to DIN 53,460, which is 5°–40° C. lower than that of the component A, with or without (C) effective amounts of conventional assistants.

6 Claims, No Drawings

ELASTOMERIC THERMOPLASTIC MOLDING MATERIALS AND THEIR PREPARATION

It has been disclosed that the impact strength of thermoplastic nylons can be improved by admixing elastomeric polymers. The latter should be present in the polycondensate in very finely divided form. German Laid-Open Application DOS No. 3,019,233 discloses that the addition of relatively small amounts of nylons to grafted polybutadiene rubbers which are composed of substantially crosslinked particles of defined size results in good thermoplastic processability of the graft polymers. Such elastomeric thermoplastic molding materials possess not only good thermoplastic processability but also high impact strength down to −40° C. However, these resilient elastomeric molding materials are still unsatisfactory with regard to their other properties, such as Shore hardness, tensile strength, elongation at break, abrasion, modulus of elasticity and heat distortion resistance.

It is an object of the present invention to provide elastomeric thermoplastic molding materials which possess good processability and high impact strength and furthermore have a high notched impact strength, are abrasion-resistant, hard, heat distortion-resistant and resistant to ageing and possess a smooth surface.

We have found that this object is achieved by elastomeric thermoplastic molding materials containing (A) from 5 to 50 parts by volume of a partially or completely crystalline thermoplastic polymer having a melting point of above 160° C., as a coherent phase, and (B) from 95 to 50 parts by volume of one or more crosslinked elastomeric polymers which are prepared by emulsion polymerization, are dispersed in the component A and have a glass transition temperature Tg of below −10° C., the sum of A and B being 100 parts by volume, with the proviso that the mixture of A and B has a Vicat softening temperature, measured according to DIN 53,460, which is 5°–40° C. lower than that of the thermoplastic polymer A, with or without (C) effective amounts of conventional assistants.

The novel elastomeric thermoplastic molding materials possess a high notched impact strength and improved abrasion resistance. Moreover, they exhibit increased hardness, high heat distortion resistance and a smooth surface, and are resistant to ageing.

The elastomeric thermoplastic molding materials contain, as component A, from 5 to 50 parts by volume of a completely or partially crystalline thermoplastic polymer having a melting point of above 160° C. The melting point is determined according to DIN 53,736. Advantageously, the thermoplastic polymer A is not less than 20%, in particular not less than 30%, crystalline.

Preferred thermoplastic polymers A are nylons, straight-chain saturated polyesters or polyacetals. Nylons and straight-chain saturated polyesters have become particularly important industrially.

Suitable nylons are obtained by condensation of equimolar amounts of a saturated dicarboxylic acid of 4 to 12 carbon atoms with a diamine of 4 to 14 carbon atoms. Particularly preferred condensates are those obtained from α,ω-alkanedicarboxylic acids of 6 to 12 carbon atoms with an α,ω-alkanediamine of 6 to 8 carbon atoms. Examples are polyhexamethyleneadipamide, polyhexamethyleneazelaic acid amide, polyhexamethylenesebacic acid amide and polyhexamethylenedodecanedioic acid amide. Useful nylons are also derived from lactams possessing from 7 to 13 ring members. Examples of suitable nylons which can be obtained by polymerization of lactams are polycaprolactam and polylaurolactam. Other suitable condensates are those obtained from poly-11-aminoundecanoic acid. It is also possible to use nylons which are prepared by copolymerization of two or more of the above polymers, eg. copolymers of adipic acid, isophthalic acid and hexamethylenediamine. Preferably, the nylons are straight-chain and have a melting point higher than 200° C. Polycaprolactam, polylaurolactam, polyhexamethyleneadipic acid amide and polyhexamethylenesebacic acid amide have become particularly important industrially.

The nylons used generally have a relative viscosity of from 2 to 5, measured in a 1% strength by weight solution in sulfuric acid at 23° C.

Particularly useful nylons are those having a relative viscosity of from 2.5 to 4.0.

Examples of suitable polyacetals are polyoxymethylenes, such as homopolymers of formaldehyde or copolymers of formaldehyde and of trioxane with cyclic and/or straight-chain formals, eg. 1,3-dioxolane or butanediol-formal, or epoxides, such as ethylene oxide or propylene oxide.

As a rule, the homopolymers possess thermally stable terminal groups, such as ester or ether groups. The copolymers of formaldehyde or of trioxane advantageously contain more than 50, in particular more than 75, % of oxymethylene groups. Copolymers which have proven particularly useful are those in which not less than 0.1% of the comonomer groups possess two or more adjacent carbon atoms in the chain. Polyacetals which contain from 0.5 to 10, in particular from 1 to 5, % of comonomers have become particularly important industrially. Such copolymers can be obtained in a conventional manner by cationic copolymerization of trioxane with suitable comonomers, such as cyclic ethers or acetals, eg. ethylene oxide, 1,3-dioxolane, 1,3-dioxane or 1,3-dioxacylcycloheptane, or with straight-chain oligoformals or polyformals or polybutanediol-formal. As a rule, the polyacetals used have a molecular weight of from 20,000 to 150,000.

Preferred straight-chain saturated polyesters are of the formula —G(SG)$_n$—, where S is a dicarboxylic acid radical derived from alkane- and/or benzene- or naphthalenedicarboxylic acids, G is a diol radical derived from an aliphatic or aromatic diol, and n is an integer greater than 30. An essential feature of the polyesters used is that they are not less than 20% crystalline. The crystallinity can be measured by a conventional physicochemical method, eg. differential thermal analysis or X-ray structural analysis. The crystallinity is advantageously greater than 40%. The crystallite melting point of the polyesters used is advantageously from 160° to 260° C.

Advantageously, the polyesters have an intrinsic viscosity of from 0.5 to 1.0, in particular from 0.6 to 0.8, measured in a 0.5% strength by weight solution in a 3:2 (w/w) phenol/o-dichlorobenzene mixture at 25° C. Preferred mean degrees of polymerization of the polyesters are from 30 to 160, in particular from 80 to 140.

Particularly preferred polyesters are derived from alkanedicarboxylic acids of 6 to 12 carbon atoms or benzenedicarboxylic acids and alkanediols of 2 to 12 carbon atoms. In industrially important polyesters, not less than 50 mole % of the dicarboxylic acid radicals are derived from terephthalic acid and not less than 50 mole % of the diol radicals are derived from ethylene glycol, butane-1,4-diol or hexane-1,6-diol. The remainder, of course, are derived from other dicarboxylic acids or diols from amongst those listed.

Examples of suitable dicarboxylic acids are adipic acid, azelaic acid, glutaric acid, sebacic acid, naphthalene-2,6-dicarboxylic acid, naphthalene-2,7-dicarboxylic acid, terephthalic acid and isophthalic acid. Examples of suitable diols are ethylene glycol, butane-1,4-diol, hexane-1,6-diol and dimethylolcyclohexane.

Polyethylene terephthalate and polybutylene terephthalate have become particularly important industrially.

The novel molding materials contain from 5 to 50, in particular from 15 to 30, parts by volume, based on the components A and B, of the above thermoplastic polymers, as a coherent phase.

The novel elastomeric thermoplastic molding materials contain, as component B, from 95 to 50, in particular from 85 to 70, parts by volume of one or more crosslinked elastomeric polymers which are prepared by emulsion polymerization, are dispersed in the component A and have a glass transition temperature Tg of less than $-10°$ C., the sum of A and B being 100 parts by weight.

An essential feature of the elastomeric polymers used is that they are crosslinked to such an extent that they do not form a coherent phase in the thermoplastic polymer.

Such elastomeric polymers are known per se. They are prepared by emulsion polymerization of suitable monomers, such as butadiene, isoprene or higher alkyl esters of acrylic acid or methacrylic acid, in the presence or absence of not more than 30% by weight of monomers, such as styrene, acrylonitrile, methyl acrylate or methyl methacrylate, which give hard polymers when homopolymerized. The emulsion polymerization technique is described in detail in Houben-Weyl, Methoden der organischen Chemie, volume XII, 1 (1961), pages 133-406.

In order to effect adequate crosslinking, it is advantageous concomitantly to use from 5 to 10% by weight, based on the monomers, of crosslinking agents, eg. bifunctional monomers, such as butanediol diacrylate or dicyclodecenyl acrylate.

Particularly advantageous elastomeric polymers consist of esters of (meth)acrylic acid of not more than 15 carbon atoms and from 5 to 20% by weight of comonomers which possess 2 or more double bonds per molecule and can be crosslinked by means of free radicals. Particularly suitable starting materials are n-butyl acrylate and ethylhexyl acrylate.

It has also proven useful for the elastomeric polymers to contain adhesion-promoting groups, such as carboxyl, carboxamido, carboxylic anhydride or epoxide groups. This is achieved if acrylic or methacrylic acid, an amide of one of these, glycidyl acrylate or, instead of the free acid, tert.-butyl acrylate is used as a comonomer, in an amount of from 0.1 to 10% by weight.

It is particularly advantageous if a shell which has a glass transition temperature of less than $-10°$ C. and contains an adhesion-promoting monomeric building block is grafted onto the elastomeric polymer. Graft monomers which have proven particularly useful are esters of acrylic acid, such as n-butyl acrylate, with the above-mentioned crosslinking agents and monomers containing the stated adhesion-promoting groups. Advantageously, the shell amounts to 10-50% by weight of the total elastomeric polymer. The rubber particles can also be provided with a hard shell, for example of styrene, styrene-acrylonitrile or methyl methacrylate, but this should be very small since it does not contribute significantly to the rubber properties of the molding materials.

The elastomeric polymer B is crosslinked to such an extent that the novel mixture of A and B has a Vicat softening temperature, measured according to DIN 53,460, which is 5°-40° C., in particular 15°-30° C., lower than that of the thermoplastic polymer A.

It has also proven particularly advantageous if the elastomeric polymers have a swelling index, in toluene, of from 2 to 8, in particular from 4 to 8.

The swelling index in toluene is determined as follows: 1 g of the precipitated rubber is dried at 70° C. and under 250 mbar for 24 hours. The dry rubber sample is then shaken in 100 ml of toluene for 24 hours at 23° C., and the resulting gel is then separated off by centrifuging at 40,000 g. The weight of the gel is determined, this gel is dried for 24 hours at 70° C. and under 250 mbar, and the weight of the sample thus obtained is once again determined. The swelling index is then obtained from the following formula:

$$\text{Swelling index} = \frac{\text{weight of the swollen gel}}{\text{weight of the gel after drying}}$$

The novel mixtures can contain, as further components C, any additives and/or assistants as are conventionally used for thermoplastic polyamines. Examples of such additives and/or assistants are dyes, pigments, antistatic agents, antioxidants, flameproofing agents and lubricants. Further additives are reinforcing fillers, such as talc, glass spheres or glass fibers. The additives and/or assistants are employed in conventional and effective amounts, preferably in amounts of from 0.1 to 30% by weight, based on the sum of the components A and B.

The novel elastomeric thermoplastic molding materials are prepared, as a rule, by a method in which dry rubber, or rubber which is moist after centrifuging to precipitate it from the dispersion, is mixed, in an extruder, with the thermoplastic polymer A, in the presence or absence of further assistants C. An advantageous procedure is as follows: first, the thermoplastic polymer A is plastified in an extruder, and the melt is then mixed thoroughly with the rubber dispersion. During this procedure, the water evaporates spontaneously and the rubber particles become dispersed in the melt. In a particularly advantageous procedure, the thermoplastic polymer A is first plastified in an extruder, the rubber dispersion is added via feed orifices arranged along the extruder and is mixed thoroughly with the polymer melt, and the volatile components are removed via a vent. The material is then extruded, cooled and comminuted. The processing temperature is in the usual range for the thermoplastic polymers A in question, eg. from 220° to 300° C. in Wthe case of nylons. Advantageously, a very low temperature is chosen in order to avoid thermal damage to the components. It has also proven useful if the rubber dispersions are not fed into the melt all at once, but instead about 50% by weight of the rubber, in the form of a dispersion, is first introduced in a first pass, and then the remaining amount of the rubber dispersion is incorporated in a second pass.

The molding materials according to the invention possess useful mechanical properties and are suitable for the production of industrial moldings of all types.

The glass transition temperature of the rubber is determined by the DSC method (Macromol. Chem. 127 (1968) page 1 et seq.).

The Examples which follow illustrate the invention.

EXAMPLES

In the Examples, the following emulsion polymers were used:

E1

An elastomeric polymer comprising 60% by weight of a core consisting of 100 parts by weight of n-butyl acrylate, and 40% by weight of a shell consisting of 98 parts by weight of n-butyl acrylate and 2.0 parts by weight of methacrylic acid.

The polymers were prepared by emulsion polymerization in 66 parts by weight of water, using 1.0 part by weight of the sodium salt of a $C_{12}$-$C_{18}$-paraffinsulfonic acid as an emulsifier and 0.35 part by weight of potassium persulfate as a catalyst, at 65° C. The monomers for the core were first added and polymerized, after which the monomers for the shell were introduced. The particle size was 0.4 μm (monodisperse), the solids content was 60% by weight, the glass transition temperature about −40° C. and the swelling index 31.

E2

An elastomeric polymer comprising 60% by weight of a core consisting of 98 parts by weight of n-butyl acrylate and 2 parts by weight of tricyclodecenyl acrylate, and 40% by weight of a shell consisting of 96.04 parts by weight of n-butyl acrylate, 1.96 parts by weight of methacrylic acid and 2 parts by weight of tricyclodecenyl acrylate.

The polymer was prepared as described for E1. The emulsion had a solids content of 60% by weight, the particle size was 0.4 μm (monodisperse), the glass transition temperature about −40° C. and the swelling index 9.8.

E3

An elastomeric polymer comprising 60% by weight of a core consisting of 96 parts by weight of n-butyl acrylate and 4 parts by weight of tricyclodecenyl acrylate, and 40% by weight of a shell consisting of 94.08 parts by weight of n-butyl acrylate, 1.92 parts by weight of methacrylic acid and 4 parts by weight of tricyclodecenyl acrylate.

The polymer was prepared as described for E1. The solids content was 60% by weight, the particle size 0.4 μm, the glass transition temperature about −40° C. and the swelling index 8.3.

E4

An elastomeric polymer comprising 60% by weight of a core consisting of 94 parts by weight of n-butyl acrylate and 6 parts by weight of tricyclodecenyl acrylate, and 40% by weight of a shell consisting of 92.12 parts by weight of n-butyl acrylate, 1.88 parts by weight of methacrylic acid and 6 parts by weight of tricyclodecenyl acrylate.

The polymer was prepared similarly to E1. The particle size was 0.4 μm (monodisperse), the glass transition temperature about −40° C., the solids content 60% and the swelling index 8.0.

E5

An elastomeric polymer comprising 60% by weight of a core consisting of 92 parts by weight of n-butylacrylate and 8 parts by weight of tricyclodecenyl acrylate, and 40% by weight of a shell consisting of 90.16 parts by weight of n-butyl acrylate, 1.84 parts by weight of methacrylic acid and 8 parts by weight of tricyclodecenyl acrylate.

The polymer was prepared by emulsion polymerization, similarly to E1. The solids content was 60%, the particle size 0.4 μm, the glass transition temperature about −40° C. and the swelling index 6.7.

EXAMPLES 1 AND 2 AND COMPARATIVE EXAMPLES 1 TO 3

The preparation of the thermoplastic molding materials was carried out in two passes through an extruder. The nylon was fed into the feed zone of the extruder and was plastified at 250° C. The aqueous suspension of the elastomeric polymer was metered (1 part of nylon to 1 part of rubber) into a downstream zone and mixed thoroughly with the nylon melt. In a further zone, the water was evaporated spontaneously and removed, after which the molding material was extruded, cooled and comminuted. In the second pass through the extruder, rubber dispersion was incorporated into the product from the first step in an amount sufficient to produce the final mixture. The types of rubber used (emulsions), the mixing ratio and the results obtained with injection molded articles are shown in the Table below.

TABLE

|  | Comparative Examples | | | Examples | |
|---|---|---|---|---|---|
|  | 1 | 2 | 3 | 1 | 2 |
| Rubber No. | E 1 | E 2 | E 3 | E 4 | E 5 |
| Swelling index | 31 | 9.8 | 8.3 | 8.0 | 6.7 |
| Content of rubber, in % by weight, in the molding material | 7 | 73.4 | 73.4 | 74.2 | 72.6 |
| Shore hardness | x | 22 | 28 | 32 | 35 |
| Tensile strength N/mm$^2$ |  | 5 | 7 | 9 | 10 |
| Elongation at break, % |  | 29 | 52 | 65 | 65 |
| Abrasion, mg |  | 430 | 230 | 180 | 190 |
| Modulus of elasticity, N/mm$^2$ |  | too soft | | 350 | 470 |
| Vicat temperature, °C. |  | 30 | 58 | 181 | 192 |
| Permanent deformation after 30% elongation |  | 3.4 | 1.9 | 1.9 | 1.6 |
| Notched impact strength at −40° C. |  | 100 | 100 | 100 | 100 | x cannot be processed

| | |
|---|---|
| Shore hardness | according to DIN 53,505, method D |
| Tensile strength | according to DIN 53,455 |
| Elongation at break | according to DIN 53,455 |
| Abrasion | according to DIN 53,516 |
| Modulus of elasticity | according to DIN 53,460 |
| Permanent deformation: | A molding from the tensile test according to DIN 53,455 was elongated by 30% and then removed from the clamping jaws, and the permanent elongation was measured after 1 minute. |
| Notched impact strength | According to DIN 53,753 |

We claim:

1. An elastomeric thermoplastic molding material containing
   (A) from 5 to 50 parts by volume of a partially or completely crystalline thermoplastic polymer comprising a nylon, a polyester or a polyacetal having a melting point of above 160° C., as a coherent phase, and (B) from 95 to 50 parts by volume of one or more cross-linked elastomeric polymers which are prepared by emulsion polymerization, are dispersed in the component A and have a glass transistion temperature Tg of below −10° C., the sum of A and B being 100 parts by volume, wherein the elastomeric polymer B consists of esters of (meth) acrylic acid of not more than 15 carbon atoms and from 5 to 20% by weight of comonomers which possess 2 or more double bonds per molecule and can be cross-linked with free radicals, with the proviso that the mixture of A and B has a Vicat softening temperatures, measured according to DIN 53,460, which is 5°–40° C lower than that of the component A, with or without (C) effective amounts of conventional assistants.

2. An impact-resistant thermoplastic molding material as claimed in claim 1, wherein the elasomeric polymer B has a swelling index, in toluene, of from 2 to 8.

3. An impact-resistant thermoplastic molding material as claimed in claim 1, wherein the elastomeric polymer B possesses, on the surface of the particles, molecular groups which promote adhesion to the molecules of the polymer A.

4. An impact-resistant thermoplastic molding material as claimed in claim 1, wherein the elastomeric polymer B contains carboxyl, carboxylic ester, carboxamide or epoxide groups, at least at the surface of the particles.

5. An impact-resistant thermoplastic molding material as claimed in claim 1, which is obtained by thorough mixing of a melt of the polymer A with an aqueous dispersion of the elastomeric polymer B, with the simultaneous removal of the water vaporized during this procedure.

6. A process for the preparation of a thermoplastic molding material as claimed in claim 1, wherein a melt of the polymer A is mixed thoroughly with an aqueous dispersion of the elastomeric polymer B and at the same time the water vaporized in this procedure is removed.

* * * * *